United States Patent

[11] 3,622,777

| [72] | Inventor | Robert J. Bovio<br>Lowell, Mass. |
|---|---|---|
| [21] | Appl. No. | 812,065 |
| [22] | Filed | Apr. 1, 1969 |
| [45] | Patented | Nov. 23, 1971 |
| [73] | Assignee | Sylvania Electric Products, Inc. |

[54] AQUARIUM LIGHTING FIXTURE
1 Claim, 2 Drawing Figs.

[52] U.S. Cl. .................................................. 240/26,
119/5, 240/47, 240/51.11 R
[51] Int. Cl. ............................................ F21v 31/00
[50] Field of Search ........................................ 240/26,
51.11, 47; 119/5; 98/400 L

[56] References Cited
UNITED STATES PATENTS

| 2,016,474 | 10/1935 | Wood | 240/47 X |
|---|---|---|---|
| 3,168,985 | 2/1965 | Troup et al. | 240/47 X |
| 2,332,039 | 10/1943 | Zampol | 240/41.5 X |
| 2,436,635 | 2/1948 | Bishop, Jr. | 240/51.11 |
| 2,883,519 | 4/1959 | Picha et al. | 240/51.11 |
| 3,225,736 | 12/1965 | Willinger et al. | 119/5 |
| 3,348,465 | 10/1967 | Kruger | 240/47 X |
| 3,361,900 | 1/1968 | Berg et al. | 240/41.5 X |
| 3,513,585 | 5/1970 | Ross | 240/2 X |

*Primary Examiner*—Samuel S. Matthews
*Assistant Examiner*—Richard M. Sheer
*Attorneys*—Norman J. O'Malley and Laurence Burns ABSTRACT: An aquarium lighting fixture incorporated into a cover that is positioned above the tank portion of the aquarium. The cover fixture includes a lamp and reflector which are protected by a snapin acrylic shield from spray caused by the water cycling apparatus of the tank. The cover fixture is spaced from the metal frame of the tank by insulator pads that also provide protection from accidental electrical shock.

PATENTED NOV 23 1971

3,622,777

ROBERT J. BOVIO
INVENTOR

BY Lawson Burns
ATTORNEY

AQUARIUM LIGHTING FIXTURE

FIELD OF INVENTION

This invention relates, in general, to a lighting fixture for an aquarium, and more particularly to a protective water spray shield and an electrical insulator means. In aquarium lighting, the light utilized should come from above, in accordance with the situation in nature. In this manner, the light rays strike the fish directly and bring out their true beauty by revealing their reflective colors. Also the light enhances both display and plant growth. The light source when positioned above the tank is usually directly in contact with the tank itself, thus all parts of the lighting fixture are directly exposed to the moisture emanating from the aquarium.

PRIOR ART

In aquariums where tropical fish and plant life exist, it is also necessary to provide lighting and aerating devices for longer free maintenance. Plant life requires the process of photosynthesis where light unites with carbon dioxide and water, to form carbohydrates, the basic food for all living organisms, and also to release oxygen as a byproduct. Many advances in aquarium lighting have been made where lamps having energy source for biological response have been developed. These lamps radiate in two regions of the spectrum to produce maximum efficiency in plant response.

The importance of plants in the aquarium has only been fully evaluated within recent years. Plants tend to provide an environment similar to the natural habitat of the fish. The plants and fish in the aquarium maintain an advantageous relationship to one another. The wastes from the fish are excellent fertilizer for the plants which help rid the aquarium of an otherwise useless byproduct from the fish.

In most recent advancements in aquarium lighting, fluorescent lamp fixtures with biologically responsive lamps are placed within the cover portion of the tank, the cover usually resting directly on the metal frame of the tank. In this way, the lamps are inches away from the water. In larger aquarium additional devices such as filtering pumps are used to ensure pure water for the fish. The filter pump cycles the water, and in doing so, sprays the reclaimed water back to the top of the tank. The constant flow of water to the top of the tank causes agitation to the surface of the water thereby splashing the metal surface of the fixture. Constant buildup of residue and rust on the fixture and lamp requires early maintenance and more than likely, short life of the complete fixture.

SUMMARY OF THE INVENTION

In my improved aquarium lighting fixture, I have overcome the disadvantages mentioned above. The lighting fixture of the instant invention is incorporated within the top cover of the aquarium which is spaced from the tank by electrical insulators.

The fixture comprises one or more fluorescent lamps, depending on the size of the aquarium and a reflector disposed behind the lamps, and a snap-in clear acrylic splash guard covering the lamps. Air vents in the top and side surfaces of the cover allow air currents to be developed to dissipate the heat generated by the lamps.

With this arrangement, the lamp, reflector, and the entire inner cover is protected from water encrustations and rust due to the water spray. The cover fixture is also electrically safe during maintenance of the tank.

Other objects and features of the invention will be readily apparent from the following description of the drawings in which.

DESCRIPTION OF THE PREFERRED EMBODIMENT

Figure 1:
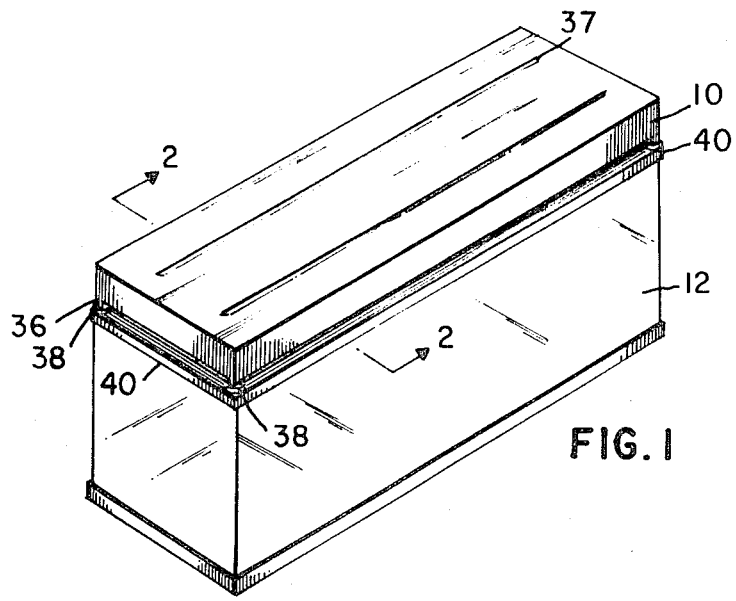
FIG. 1 is a perspective view of a complete aquarium showing in particular the improved cover positioned above the tank.

Referring to the drawings, my improved aquarium lighting fixture is incorporated within a metal housing 10 that is equal to the dimensions of the top area of a typical aquarium tank 12.

Figure 2:
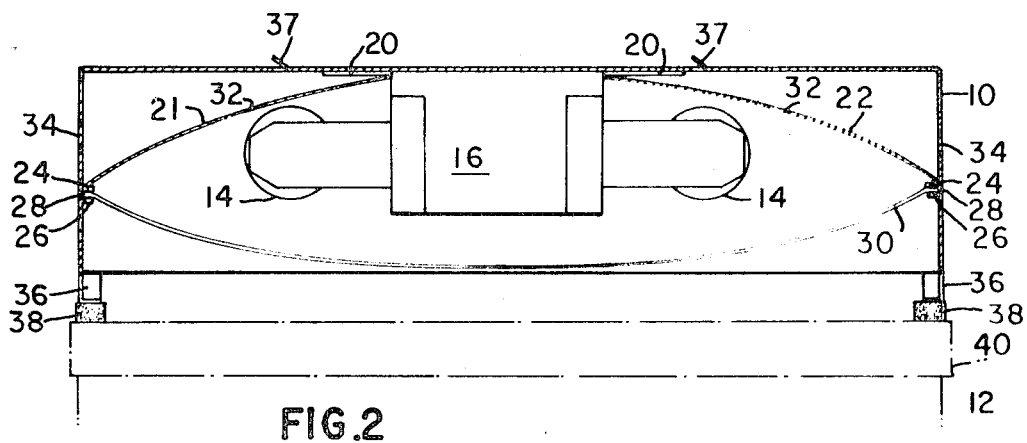
FIG. 2 is an enlarged cross-sectional view of the top cover taken on the line 2—2 of FIG. 1.

In FIG. 2, a cross section of the aquarium lighting fixture is illustrated. The fixture comprises a metal shell housing 10, the open end of which faces the open end of the aquarium tank. The housing 10 is spaced above the tank to allow circulation of air to the surface of the water. In spacing the housing in this way, metal legs 36 were formed to provide bearing points. This would bring the metal housing of the lighting fixture into direct contact with the metal frame 40 of the aquarium tank, thus providing a possibility of accidental shock. To prevent this, we have electrically insulated the fixture by use of insulator pads 38 attached to each leg 36 of the fixture.

A ballast housing 16 is fixed to the inner top portion of the cover by weld tabs 20. The ballast housing extends the length of the housing and is provided with the lamp holder sockets 17 at each end to support a pair of lamps 14.

Fitted directly above the lamps are individual reflectors 21, 22 that are fitted between the ballast body and a rib 24 formed on the inside of the lamp housing. A similar type rib 26 is spaced from the rib 24 forming a groove that holds the edges of an acrylic-type splash cover 30 that can be snap fitted in place and removed with ease when maintaining the fixture.

It can be mentioned at this time, that a certain amount of heat will be trapped in the space around the lamps, which will tend to cut the efficiency of the lamps.

We provide the vent holes 32 in the reflectors, holes 34, and slots 37 in the lamps housing which will allow air convection currents to be formed and carry the ambient heat out of the fixture body.

It is apparent that changes and modifications may be made within the spirit and scope of the instant invention. It is my intention, however, to be limited only to the scope of the appended claims.

I claim:

1. A lighting fixture for an aquarium comprising:
   a rectangular metal housing having a top flat surface provided with air-ventilating slots, and downwardly projecting edges having legs at each intersecting corner thereof for resting on the lip of an aquarium;
   a lamp ballast and lamp holding means positioned at the top inner portion of said top surface;
   a series of biologically stimulating lamps positioned in said lamp holding means;
   a series of reflectors fitted between said lamps and said top inner surface, said reflectors having air-ventilating means through their surfaces;
   a flexible transparent sheet positioned in the bottom opening defined by said edges covering said lamps and reflectors.

* * * * *